(12) United States Patent
Goll

(10) Patent No.: US 10,578,227 B2
(45) Date of Patent: Mar. 3, 2020

(54) HYDRAULIC DRIVE FOR EXECUTING A LINEAR MOVEMENT

(71) Applicant: VOITH PATENT GMBH, Heidenheim (DE)

(72) Inventor: Armin Goll, Mulfingen (DE)

(73) Assignee: VOITH PATENT GMBH, Heidenheim (DE)

( * ) Notice: Subject to any disclaimer, the term of this patent is extended or adjusted under 35 U.S.C. 154(b) by 124 days.

(21) Appl. No.: 15/735,637

(22) PCT Filed: Jul. 5, 2016

(86) PCT No.: PCT/EP2016/065758
§ 371 (c)(1),
(2) Date: Dec. 12, 2017

(87) PCT Pub. No.: WO2017/021080
PCT Pub. Date: Feb. 9, 2017

(65) Prior Publication Data
US 2018/0172177 A1 Jun. 21, 2018

(30) Foreign Application Priority Data

Jul. 31, 2015 (DE) .......... 10 2015 009 991
Feb. 11, 2016 (DE) .......... 10 2016 102 387

(51) Int. Cl.
*F16K 31/122* (2006.01)
*F04B 39/08* (2006.01)
*F15B 20/00* (2006.01)
*F01D 21/18* (2006.01)
(Continued)

(52) U.S. Cl.
CPC .......... *F16K 31/1221* (2013.01); *F01D 21/18* (2013.01); *F04B 39/08* (2013.01);
(Continued)

(58) Field of Classification Search
CPC ............... F15B 11/042; F15B 11/0426; F16K 31/1221; F16K 31/124; F16K 31/1245
See application file for complete search history.

(56) References Cited

U.S. PATENT DOCUMENTS 3,757,646 A    9/1973   Rohner
4,842,244 A *   6/1989   Panchison, Jr. ..... F16K 31/1635
                                                                      251/26
(Continued)

FOREIGN PATENT DOCUMENTS

DE       3432890 A1    1/1986
EP        0127027 A1   12/1984
(Continued)

*Primary Examiner* — Thomas E Lazo
*Assistant Examiner* — Matthew Wiblin
(74) *Attorney, Agent, or Firm* — Shumaker, Loop & Kendrick, LLP; James D. Miller

(57) ABSTRACT

A hydraulic drive for executing a linear movement includes a motor, a pump, a lifting cylinder having the one linearly movable piston and a cylinder housing with at least one first connection and at least one second connection, a spring arranged such that the piston can be extended or retracted when the spring is in the relaxed state, and at least one first valve with which the first connection and the second connection of the cylinder housing can be fluidly connected. At least one second valve connected in parallel with the first valve is further provided, wherein the first valve has a maximum volumetric throughflow which is greater than the maximum volumetric through-flow of the second valve.

15 Claims, 2 Drawing Sheets

(51) Int. Cl.
  *F15B 15/28*   (2006.01)
  *F15B 1/02*   (2006.01)
  *F15B 21/042*   (2019.01)

(52) U.S. Cl.
  CPC .......... *F15B 15/2815* (2013.01); *F15B 20/00* (2013.01); *F15B 20/007* (2013.01); *F15B 1/021* (2013.01); *F15B 15/28* (2013.01); *F15B 21/042* (2013.01); *F15B 2211/20561* (2013.01); *F15B 2211/41581* (2013.01); *F15B 2211/515* (2013.01); *F15B 2211/5151* (2013.01); *F15B 2211/7052* (2013.01); *F15B 2211/863* (2013.01)

(56) References Cited

U.S. PATENT DOCUMENTS

| | | | | |
|---|---|---|---|---|
| 4,911,192 A | * | 3/1990 | Hartfiel | F15B 19/002 137/14 |
| 5,044,160 A | * | 9/1991 | Warnan | G01V 1/3817 60/413 |
| 2015/0047333 A1 | * | 2/2015 | Hendrix | F16H 61/4061 60/413 |
| 2018/0328386 A1 | * | 11/2018 | Litschko | F15B 11/042 |

FOREIGN PATENT DOCUMENTS

| | | | | |
|---|---|---|---|---|
| EP | 0277602 A2 | | 8/1988 | |
| EP | 1209394 A2 | | 5/2002 | |
| EP | 2930410 A1 | * | 10/2015 | ............ F15B 7/006 |
| WO | WO-2013113317 A1 | * | 8/2013 | ............ F15B 11/006 |

* cited by examiner

HYDRAULIC DRIVE FOR EXECUTING A LINEAR MOVEMENT

CROSS-REFERENCE TO RELATED PATENT APPLICATIONS

This patent application is a United States national phase patent application based on PCT/EP2016/065758 filed Jul. 5, 2016, which claims the benefit of German Patent Application No. DE 10 2016 102 387.6 filed Feb. 11, 2016 and German Patent Application No. DE 10 2015 009 991.4 filed Jul. 31, 2015, the entire disclosures of which are hereby incorporated herein by reference.

FIELD

The invention relates to a hydraulic drive for executing a linear movement.

BACKGROUND

Hydraulic drives are used among other things to open and close valves, e.g. for gas turbines. Since in this context, high forces must be applied in order to close a valve, particularly in an emergency, at short notice and potentially over large operating ranges, hydraulic drives are preferentially used.

A linear movement can be produced by the combination of e.g. a rotatory pump and a lifting cylinder. The axial position of the piston within the lifting cylinder is thereby directly controlled by the setting of a hydrostatic pressure within the hydraulic system via the pump.

In this regard, printed publication EP 2 620 655 A1 discloses a piston cylinder having a return spring so that the return spring can extend the piston and a coupled valve closes. The coupled valve is opened by a source of volumetric fluid flow, which is driven by a servomotor, supplying a fluid to the piston cylinder and increasing the hydrostatic pressure such that the piston retracts. According to EP 2 620 655 A1, the fluid flow source can pump the working fluid in two different directions so that the piston can be both retracted as well as extended by means of the driven pump. Upon a malfunction, a parallel logic controls a valve, for example, in order to couple the inflow and the outflow of the piston cylinder such that the piston is extended via the return spring and the coupled valve closes.

SUMMARY

The present invention is based on the task of providing a hydraulic drive to convert a rotatory movement into a linear movement, wherein the hydraulic drive enables a simple, low-maintenance, cost-efficient and flexible application independent of external components and at the same time provides an accurate positioning of the piston at any arbitrary position at optimized extending speed.

This task is solved by a hydraulic drive as shown and described herein.

The drive according to the invention is provided with a motor, a pump, a lifting cylinder and a spring. The lifting cylinder comprises a linearly movable piston and a cylinder housing having at least one first connection and one second connection. The spring is furthermore arranged in the inventive drive such that the piston can be extended or retracted when the spring is in the relaxed state, in each case as a function of the spring's direction of action.

The pump can be for example a gear pump, preferably with low leakage, in order to also be able to achieve high pumping efficiency with low volumes of working fluid within the hydraulic system. The motor is preferably a variable motor such as, for example, a synchronous motor or an asynchronous motor, but can also be a switchable motor in intermittent operation. It is particularly provided for the motor for driving the pump to be a variable-speed motor. Thus, the hydrostatic pressure can be precisely adjusted, and if need be reset or readjusted respectively, by a regulated control of the motor within the hydraulic system.

The present invention further comprises at least one first valve with which the first connection and the second connection can be fluidly connected. This thus enables the hydraulic system and the spring to bring the piston into a partially or fully extended state as well as a partially or fully retracted state. By doing so, the linearly acting piston can for example completely close a valve for a gas turbine coupled to the piston rod of the piston in the extended state and completely open it in the retracted state.

In the sense of the present invention, in addition to controlling gas turbine valves, the inventive drive with the linearly movable piston can also be used for further applications in which a linear movement under the application of high forces is expedient. Nor is the use of the hydraulic drive limited just to the technical field of gas turbines.

Furthermore, it is provided that the inventive hydraulic drive in all of the configurations described herein can be a system in the form of a modular system comprised of individual components. This thus yields the possibility of, for example, arranging the motor and the reservoir differently from one another and from the remaining components. The functionality of the individual components is not affected by their orientation and/or arrangement. The hydraulic drive can thus also be realized in a sectional construction as well as a compact construction. This enables achieving both a compact design of the hydraulic drive as well as a flexible adapting to the conditions when in use. It is likewise possible to also be able to position for example temperature-critical components at sufficient space from one another so that a maximum distance and thus a minimum heat transfer occurs between the components.

Furthermore provided for the underlying invention is at least one second valve which is connected in parallel with the first valve. It is in addition provided for the first valve to have a maximum volumetric throughflow which is greater than the maximum volumetric throughflow of the second valve. Particularly the first and second valve, although equally all the further components of the inventive drive, can be of redundant design in the sense of the invention in order to reduce the probability of drive failure.

When the piston is in an at least partly retracted state, the advantage ensues that the piston can be extended by opening the first and/or the second valve. Due to the differing maximum volumetric throughflows, the piston reaches a higher extending speed when the first valve is opened than is attainable when the second valve is opened.

According to one embodiment of the drive according to the invention, the first and second valves may be designed as spring-loaded directional valves. The directional valves are furthermore electromagnetically adjustable so that at least one further second switch position can in each case be selected for the directional valves. Likewise, if no electromagnetic switchover of the valves occurs, the two valves return to a first switch position due to the spring-loaded configuration. The user of the inventive drive is thus able to bring the first and/or second valve into a desired switch position independently of one another and as needed. This yields multiple possible combinations for the position of the first valve and the second valve as a function of the respective particular application (see Table 1).

The first valve and the second valve have a first switch position and a second switch position in accordance with the present invention. In the first switch position, a flow path is provided through the first and/or second valve. If one of the two valves is in the first switch position, working fluid can flow through the respective valve from the first connection to the second connection.

TABLE 1

Valve position options for different applications

| Operating procedure | Valve | Switching status |
|---|---|---|
| Normal operation/ | first valve | check valve |
| Fully retracted | second valve | check valve |
| Fully extended | first valve | flow path |
|  | second valve | check valve |
| Partially extended | first valve | check valve |
| (large positional variance) | second valve | flow path |

A second switch position of the first and second valve produces a flow path with a check valve. In the second switch position, a fluidic connection from the first connection to the second connection is disconnected. The separating of the fluidic connection ensues automatically by the respective check valve of the first and/or second valve. If there is a large enough pressure differential from the second connection to the first connection of the cylinder housing to overcome the spring force of the check valve in the first and/or second valve, a fluidic connection from the second connection to the first connection can advantageously be established, in particular established self-actuatingly, via the respective check valve. The retracting and extending of the piston is thus selectively controllable by application of the first and second valve based on the flow paths.

In respect of the functioning of a commercially available, spring-loaded reset valve, "self-actuating" in the sense of the invention means that the valve is closed and the fluidic connection disconnected by the preload force of the incorporated spring as well as by the working fluid flowing in a specific direction in an automatic and/or independent manner and without any intervention by a user of the hydraulic drive. If the fluid flows in the opposite direction, however, the spring-loaded check valve is opened as per common general knowledge and a fluidic connection established when the hydrostatic pressure of the working fluid on the check valve is greater than the spring force within the spring-loaded check valve.

According to one embodiment, the pump has an intake and an outlet. The pump can pump a working fluid in at least one direction. The pump can further-more be reversed into the opposite direction from normal operation. When the pump is rotated reversely, a negative pressure develops at the outlet of the pump such that the working fluid can be sucked to the intake of the pump. The use of a more complex and thus more cost-intensive as well as more maintenance-intensive bidirectional pump is not required for the drive according to the invention.

In a further embodiment, a reservoir is provided for the working fluid. The reservoir, in particular the flow outlet of the reservoir, is fluidly connected to the second connection of the cylinder housing and the intake of the pump. The hydraulic drive according to the invention is intended as a closed hydraulic system. The reservoir advantageously enables a specific supply of working fluid to be provided when filling the closed hydraulic system. The reservoir can preferentially be configured as a bladder accumulator or as a piston accumulator. Particularly the use of a piston accumulator results in lower maintenance costs as well as longer system operating times.

The reservoir enables the equalizing of volumetric/pressure fluctuations within the closed hydraulic system. Moreover, the closed hydraulic system provides an economical as well as low-maintenance solution. Neither external connections or infrastructures need to be provided for the present hydraulic system nor is there the risk of external contaminants being able to be introduced into the closed system during use. As a result, the inventive system has flexibility in use.

One embodiment furthermore provides for a pressure relief valve fluidly connected to the outlet of the pump and the second connection of the cylinder housing. When a predefinable maximum pressure is reached at the outlet of the pump, the pump outlet and the reservoir can be fluidly connected. A definable maximum pressure can preferably be approximately 100 bar. This advantageously prevents excessively high hydraulic pressure within the closed hydraulic system and thus irreparable damage to system components.

A coupling is furthermore preferably provided between the motor and the pump for the transferring of force or torque respectively from the motor to the pump. The coupling is in particular releasable so that a transmission of force between the motor and pump can be interrupted.

According to a further embodiment, it is provided for the inventive drive to have at least one respective throttle device between the first connection and the first valve and/or between the first connection and the second valve. A reduction in pressure thus advantageously occurs in the influent flow from the first connection of the cylinder housing to the first valve and to the second valve, whereby the speed of the lifting cylinder can be adapted over a wide range to the needs of the application. In particular in consideration of long operating times of the inventive drive, a decreasing of the probability of failure is thereby also indirectly achieved.

A further embodiment provides for at least one temperature sensor and/or at least one pressure sensor to be fluidly connected to the first connection and/or the second connection and/or the outlet and/or the intake of the pump. This enables critical pressure conditions and critical heat inputs to be detected in the hydraulic system. Particularly in the case of only small volumes of working fluid being necessary to operate such a drive, even comparatively low heat inputs can cause substantial increases in temperature within the hydraulic system. It is therefore advantageous to be able to detect heat inputs to the working fluid over the operating period, e.g. by the pump, in order to enable system shutdown if needed. The pressure sensor also enables determining adequate filling of the system with working fluid prior to and/or during the start of operation.

In a further embodiment, the inventive subject matter furthermore comprises a position sensor on the lifting cylinder which is preferably configured as a travel sensor in order to be able to determine or respectively detect the position of the piston in the cylinder housing. Thus, at any time during the operation of the inventive drive, it is possible to determine for example the degree to which a valve coupled to the piston rod is open. In the sense of the present invention, determining, or respectively detecting, in particular means the detecting of a value which allows a conclusion to be drawn as to, for example, the piston position. In addition to using a travel sensor as a position sensor, this can likewise ensue via any other measured value associated with the piston position. Thus, a change in the pump speed to regulate the position of the lifting cylinder can be effected by means of the position sensor.

According to one embodiment, a spring-loaded check valve is furthermore provided such that a fluidic connection from the first connection to the outlet of the pump or from the outlet of the pump to the intake of the pump is disconnectable, in particular self-actuatingly or respectively automatically disconnectable. This can thereby prevent a return flow of working fluid from the first connection when the pump is at a stillstand or guard against a hydraulic short circuit from the outlet to the intake of the pump.

In a further embodiment, the inventive drive comprises a forced leakage throttle apparatus on the at least one first connection and the at least one second connection. Regardless of whether the piston is moved linearly due to hydrostatic pressure ratios or a piston position is held, a continuous movement or circulation respectively of the working fluid is ensured in the hydraulic system with a continuously running pump. In addition to preventing deposits within the working fluid, a homogeneous temperature distribution or heat dissipation respectively of temperature-critical components such as e.g. the pump is in particular enabled by means of the working fluid.

According to one embodiment, a directional valve is provided between the outlet of the pump and the intake of the pump. This allows for disconnecting a fluid connection from the outlet to the intake of the pump at a first switch position and establishing it at a second switch position of the directional valve. A hydraulic short circuit between the outlet of the pump and the intake of the pump can be achieved particularly in conjunction with the check valve between the outlet of the pump and the first connection of the cylinder housing so that the pump can circulate working fluid without impacting the position of the piston.

The hydraulic drive is provided with a motor, a pump, and a lifting cylinder comprising a linearly movable piston and a cylinder housing having at least one first connection and at least one second connection. The drive further comprises a spring arranged such that the piston can be extended or retracted in the relaxed state of the spring and at least one first valve with which the first connection and the second connection of the cylinder housing can be fluidly connected. Furthermore, at least one second valve is provided for the drive which is connected in parallel with the first valve, whereby the first valve has a maximum volumetric through-flow which is greater than the maximum volumetric throughflow of the second valve.

Furthermore, the embodiment comprises a reservoir which is fluidly connected to the second connection and the intake of the pump, a pressure relief valve so that the outlet of the pump can be fluidly connected to the reservoir upon a definable maximum pressure being reached at the pump outlet, a coupling for the transmission of a force or respectively torque between the motor and the pump, and in each case at least one throttle device in the fluidic connections between the first connection and the first valve as well as between the first connection and the second valve. Moreover, at least one temperature sensor and/or at least one pressure sensor is/are provided which is/are fluidly connected to the first connection and/or the second connection and/or the outlet and/or the intake of the pump, a position sensor, preferably a travel sensor, so as to be able to determine the position of the piston in the cylinder housing, a spring-loaded check valve so that a fluidic connection from the outlet of the pump to the intake of the pump can be disconnected by the spring-loaded check valve, and a forced leakage throttle apparatus arranged between the at least one first connection and the at least one second connection.

In another configuration, the hydraulic drive is provided with a motor, a pump, and a lifting cylinder comprising a linearly movable piston and a cylinder housing having at least one first connection and at least one second connection. The drive further comprises a spring arranged such that the piston can be extended in the relaxed state of the spring and at least one first valve with which the first connection and the second connection of the cylinder housing can be fluidly connected. At least one second valve is furthermore provided for the drive which is connected in parallel with the first valve, whereby the first valve has a maximum volumetric through-flow which is greater than the maximum volumetric throughflow of the second valve.

The embodiment furthermore comprises a reservoir which is fluidly connected to the second connection and the intake of the pump, a pressure relief valve so that the outlet of the pump can be fluidly connected to the reservoir upon a definable maximum pressure being reached at the pump outlet, a coupling for the transmission of a force or respectively torque between the motor and the pump, and at least one throttle device in the fluidic connection between the first connection and the second valve. Moreover provided is at least one pressure sensor which is fluidly connected to the first connection and/or the second connection and/or the outlet and/or the intake of the pump, a spring-loaded check valve so that a fluidic connection from the first connection to the outlet of the pump can be disconnected by the spring-loaded check valve, and a directional valve between the outlet of the pump and the intake of the pump so that a fluidic connection from the outlet to the intake of the pump can be disconnected at a first switch position of the directional valve and can be established at a second switch position of the directional valve.

In a further embodiment, the present invention comprises a method for the application of the one hydraulic drive. Pursuant to the underlying method, the pump is driven continuously and/or when needed by the motor of the hydraulic drive. The working fluid is circulated and/or a linear movement of the piston produced and/or a position of the piston in the cylinder housing maintained, in particular kept constant over a period of time, within the closed hydraulic system. It is thus advantageously possible for the piston to be driven to a definable position or the piston position to be held for a period of time by confining or respectively holding back the working fluid in the cylinder housing, particularly at the first connection. Furthermore, both the depositing of components of the working fluid as well as an inhomogeneous temperature distribution within the hydraulic system can be prevented by the circulation of the working fluid.

In one embodiment of the inventive method, the first valve and the second valve are switched into the second switch position in an expedient application of the hydraulic drive. If the first and the second valve are each in the second switch position, the piston position is maintained or the piston is at least partly retracted.

Furthermore, the applying of the first switch position to the first or second valve has different functionalities. If the first valve is brought into the first switch position, a safety circuit, a so-called "fail-safe" function, is effected, wherein the piston is fully extended; i.e. into the end position, at maximum speed. In contrast, the second valve is brought into the first switch position when the piston is to be extended to a definable position. Setting the second valve into the first switch position preferably optimizes an extending speed or respectively positioning speed of the piston.

BRIEF DESCRIPTION OF THE DRAWINGS

The following will reference the accompanying schematic figures in describing example embodiments in greater detail. Further embodiments of the inventive subject matter within the meaning of the present invention are hereby not excluded.

Shown are.

DETAILED DESCRIPTION OF THE EMBODIMENTS

Figure 1:
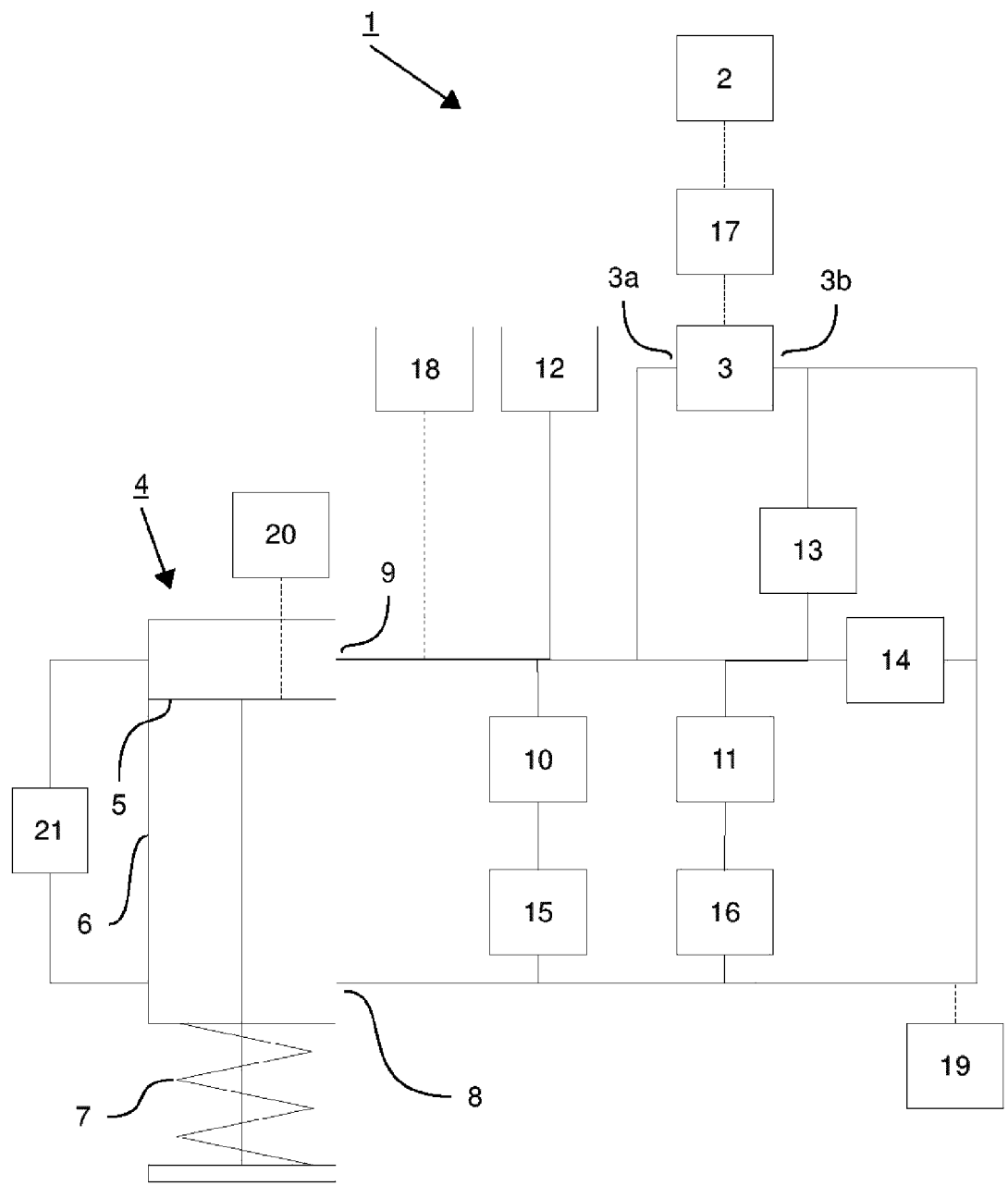
FIG. 1: a schematic representation of the inventive drive comprising the first valve and the second valve as well as a check valve between the outlet of the pump and the second connection.

In accordance with FIG. 1, the inventive drive comprises a motor 2, a pump 3 and a lifting cylinder 5. Force is transmitted from the motor 2 to the pump 3 via a coupling 17 (see FIG. 1, dotted-line connection).

The pump 3 exhibits an intake 3a and an outlet 3b and is preferably configured to pump the working fluid in a specific direction. The outlet 3b of the pump 3 is fluidly connected to the check valve 14 and the pressure relief valve 13. A fluidic connection exists from the check valve 14 to the lifting cylinder 4, in particular to the first connection 8 of the cylinder housing 6 of the lifting cylinder 4. The check valve 14 is a spring-loaded check valve and arranged such that a fluidic connection from the connection 8 to the intake 3a of the pump 3 is closed in self-actuating manner, respectively automatically, by means of the spring force of the check valve 14 and/or by means of a fluid flow. On the other hand, a fluidic connection between the intake 3b of the pump 3 and the outlet 9 can be provided if a hydrostatic pressure is present or respectively generated by the pump 3 which is large enough to overcome the spring force of the spring-loaded check valve 14 and open the check valve 14.

If the pump 3 pumps the working fluid toward connection 8 with enough pressure, a linear retracting motion of the piston 5 in the cylinder housing 6 can be produced. The spring 7 provided for the lifting cylinder 4 is compressed and its preload force increased as the piston 5 with the piston rod is retracted into the cylinder housing. On the basis of this linear retracting motion of the piston 5, a valve of a gas turbine coupled to the free end of the piston rod, for example, can be opened.

In the sense of the embodiment according to FIG. 1, it is preferably provided for the pump 3 to be driven continuously by the motor 2. A closed fluid circulation is formed throughout the lifting cylinder 4 by means of a forced leakage throttle apparatus 21 so that the working fluid continuously supplied to the lifting cylinder 4 via the first connection 8 can be fed to the second connection 9 of the cylinder housing 6 and a circulation is formed. The continuous recirculating of the working fluid prevents deposits in the hydraulic system as well as achieves a homogeneous temperature distribution within the working fluid.

The position of the piston 5 in the cylinder housing 6 is controllably adjustable by means of the pump 3 and the spring 7. In order to retract the piston 5, or respectively drive it into the cylinder housing 6 toward the second connection 9, the pump 3 pumps working fluid toward the first connection 8 via outlet 3b. In order to extend the piston 5, or respectively drive it out in the cylinder housing 6 toward connection 8, the output power of the pump 3 is reduced or the pump 3 stopped respectively so that the hydrostatic pressure in the cylinder housing decreases and the pretensioned spring 7 can at least partially relax. Additionally, the extending of the piston 5 can be supported by a reverse rotation of the pump 3, whereby a negative pressure is produced at the outlet 3b of the pump 3 and a suction effect occurs. In doing so, the position of the piston 5, and thus for example the degree to which a valve coupled to the piston rod can open, can be continuously regulated or controllably adjusted respectively.

Furthermore, the spring-loaded check valve 14 between the intake 3a and the outlet 3b of the pump is arranged such that working fluid is for example sucked out of the reservoir 12 via the check valve 14 upon a reverse rotation of the pump 3 and a negative pressure and/or a suction effect at outlet 3b and an overheating of the pump 3 is prevented. Also achieved by means of the spring-loaded check valve 14 is a self-actuating or respectively automatic disconnecting of the fluidic connection from the outlet 3b to the intake 3a of the pump 3 when the pump 3 pumps working fluid toward the first connection 8.

The connection 8 exhibits further fluidic connections to the first valve 10 and the second valve 11, whereby throttle devices 15; 16 are provided in each fluidic connection to the two valves 10; 11. The first valve 10 and the second valve 11 are spring-loaded and electromagnetically adjustable directional valves having at least two switch positions. Each first switch position of the first and second valve 10; 11 produces a flow path so that a fluidic connection can be established from the first connection 8 to the second connection 9 of the cylinder housing 6. Each second switch position of the two valves 10; 11 comprises a spring-loaded check valve which is arranged such that a fluidic connection from the first connection 8 to the second connection 9 can be self-actuatingly or respectively automatically disconnected. A fluidic connection from the second connection 9 to the first connection 8 can be established provided there is sufficient hydrostatic pressure in order to overcome the spring force of the respective spring-loaded check valve of the first and/or second valve 10; 11 in the second switch position and thus open the respective valve. The throttle devices 15; 16 upstream of the first valve 10 and the second valve 15; 16 further serve in reducing the hydrostatic pressure in advance of the respective valve 10; 11 and enable the setting of the lifting cylinder 4 movement speed over wide control ranges.

Thus, it is possible pursuant to the underlying invention according to FIG. 1 to extend the piston 5 by bringing the first valve 10 and/or the second valve 11 into the second switch position. When the first or second valve 10; 11 is switched into the first switch position, the hydrostatic pressure of the working medium previously built up in the lifting cylinder 4 via the pump 3 can escape in the direction of the second connection 9 and the reservoir 12 via the valve in the first switch position. The piston 5 is extended by the pretensioned spring 7 upon decreasing pressure in the lifting cylinder 4. Based on this linear movement of the piston 5 due to an outflow of the working medium via the first connection 8 and an associated pressure drop in conjunction with the relaxing of the spring 7, a valve of a gas turbine coupled to the piston rod, for example, can be closed.

Preferably, the first valve 10 has a greater maximum volumetric throughflow than the second valve 11. This can in particular be achieved by way of different sizes to the two valves 10; 11 and the respective fluidic connection cross sections. This results in two advantageous modes of operation for the present invention according to FIG. 1.

If the piston 5 is in an at least partly retracted state, a first advantageous application exists in the full extending of the piston 5 at maximum speed. To that end, the first valve 10 is opened or respectively brought into the first switch position. A hydraulic short circuit is produced between the first connection 8 and the second connection 9. The second valve 11 remains closed, or in the second switch position respectively, and represents a spring-loaded check valve. Due to the hydrostatic pressure decreasing over the first connection 8, the pretensioned spring 7 can relax and the piston 5 is extended. Additionally and/or supportively, the motor 2 can be briefly accelerated such that the pump 3 induces a negative pressure at the outlet 3b of the pump 3 by a rotation in the reverse direction in order that no further fluid is pumped toward the first connection 8, or a negative pressure produced respectively. Subsequently, in particular as soon as the piston 5 is fully extended, the motor 2 is switched off or respectively put into a standby state.

This procedure corresponds to an uncontrolled extending of the piston 5 and can be understood as a safety circuit for a coupled valve. Such a valve coupled to the piston rod can be closed at maximum speed by the first valve 10 being switched into the first switch position. Furthermore, a plurality of first valves 10 connected parallel to each other can also be provided, thereby achieving a redundancy of this functionality.

A second advantageous application of the inventive drive according to FIG. 1 ensues in the case of opening the second valve 11 by switching into the first switch position while the first valve 10 remains in the second switch position and acts as a spring-loaded check valve. In particular, the second valve 11 is brought into a first switch position in order for the piston 5 to be extended at optimized speed to a specific predetermined position. This corresponds to a rapid controlled extending of the piston 5 in a direction in which the pretensioned spring 7 partly relaxes. This method is in particular employed if an actual position exhibits a sufficiently large enough deviation from the defined target position.

Shortly before reaching the predefined target position of the piston 5, the second valve 11 is closed again and the target position reached in controlled manner by means of the motor 2, respectively pump 3. In contrast to the first advantageous application for fully extending the piston 5, the motor 2, or respectively pump 3, continues on in continuous operation in this second advantageous usage. The switching of the second valve 11 into the first switch position enables a regulated albeit equally quick reaching of the target position as can typically be achieved with the motor 2, respectively pump 3, in conjunction with the pretensioned spring 7. Despite the increased extending speed, however, the same accuracy is achieved in reaching the target position since only large positional deviations are resolved by the second valve 11 switching into the first switch position. The precision adjusting of the target position of the piston 5 ensues as normal by means of the spring 7 as well as the motor 2/pump 3.

The hydraulic drive according to FIG. 1 further comprises a pressure relief valve 13 having a fluidic connection to the outlet 3b of the pump 3. Upon a maximum pressure being reached in the closed hydraulic circuit, and in particular at the outlet 3b of the pump, the pressure relief valve 13 enables a short circuit between the outlet 3b and the reservoir 12. Preferably, the maximum pressure thereto can be set to a value of approximately 100 bar or, depending on the components employed, to a lower or higher pressure. The pressure relief valve can thus open in self-actuating, respectively automatic manner upon a maximum pressure being detected and a pressure reduction or respectively pressure equalization achieved through, among other things, the inclusion of the reservoir 12.

Furthermore, the position sensor 20 is preferably configured as a travel sensor. However, the position sensor could also record other measured values allowing a conclusion as to the position of the piston 5 within the cylinder housing 6. In particular, the measured value of the position sensor 20 can be matched to the number of revolutions of the motor 2 in order to thereby obtain redundant information on the position of the piston 5. Thus, the position of the piston 5 is reliably detectable, particularly upon retraction of the piston 5, e.g. to open a valve coupled to the piston rod, and upon extending, e.g. to close a valve coupled to the piston rod. Additionally to position sensor 20, further proximity switches can be provided, particularly to detect the reaching of an end position during the retraction or extension of the piston 5.

In addition to the position sensor 20, at least one temperature sensor 19 and a pressure sensor 18 are also provided in the inventive system according to FIG. 1, which likewise have a signal connection or respectively measuring connection to the hydraulic system (see FIG. 1, dotted-line connection). In accordance with FIG. 1, the pressure sensor is provided in the direct vicinity of the reservoir 12 and serves, among other things, in measuring the preload pressure, or respectively the degree of filling, upon the system being filled with working fluid prior to the start of operation. Moreover, the pressure sensor can also detect critical pressure conditions or leakages during the operation of the hydraulic drive. This thereby enables preventing an overloading of the motor 2. As per FIG. 1, the temperature sensor is provided between the outlet 3b of the pump 3 and the first connection 8. Since the pump 3 introduces significant heat into the working fluid/hydraulic system, the homogeneity of the temperature distribution within the working fluid can among other things be measured. It is however also likewise possible for a plurality of pressure and/or temperature sensors to be provided in the inventive drive at different positions within the hydraulic system so as to enable a comprehensive monitoring of the given drive's operating status.

The drive according to the invention preferably further comprises at least one interface for the output of data and for the input of operating commands by a system user. In addition, a suitable computer unit can be used to process the detected data, prepare it for the user, and/or assume the user-controlled, semi-automatic or fully automatic regulating and/or controlling of the hydraulic drive.

Figure 2:
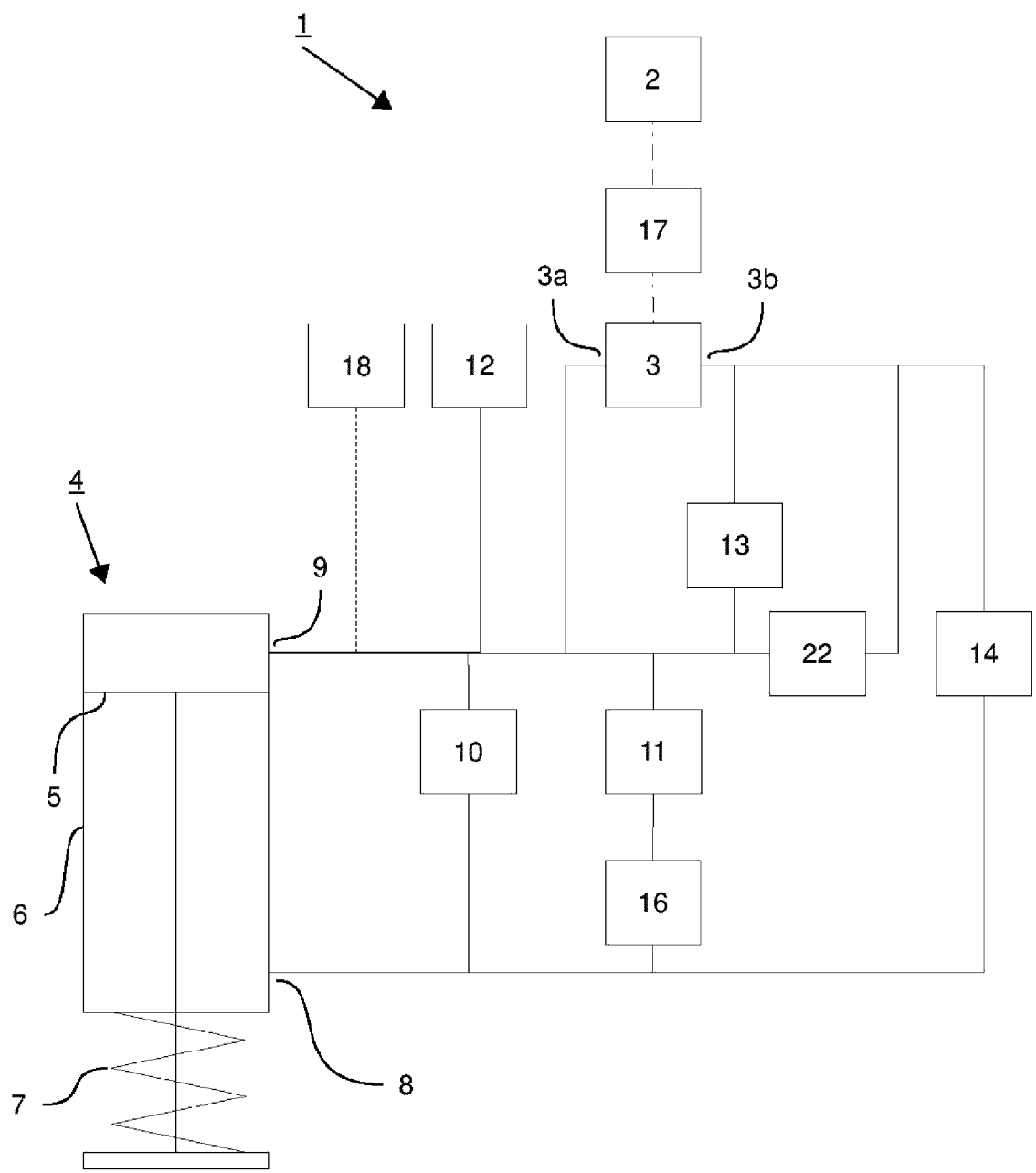
FIG. 2: a schematic representation of the inventive drive comprising the first valve and the second valve as well as a check valve between the intake and the outlet of the pump.

FIG. 2 shows a modified implementation of the inventive drive from FIG. 1. In particular, a system for continuous circulation of fluid over the piston 5 by a forced leakage throttle apparatus is not provided according to FIG. 2, just as a throttle device 16 is only arranged in the fluidic connection between the first connection 8 and the second valve 11. Moreover, the check valve 14 according to FIG. 2 is arranged between the outlet 3b of the pump 3 and the first connection 8. A further directional valve 22 is positioned in the hydraulic system in order to fluidly connect and hydraulically short circuit the outlet 3b of the pump 3 to/from the intake 3a of the pump as needed. The directional valve 22 is a spring-loaded, electromagnetically adjustable directional valve. A fluid connection from the outlet 3b to the intake 3a of the pump exists in the second switch position whereas the fluidic connection is disconnected in the first switch position, preferably by means of as-needed connection to blind connections.

In a system according to FIG. 2, the piston 5 is retracted by the motor 2 together with the pump 3 supplying working fluid to the first connection 8. As soon as the piston 5 is fully retracted, e.g. as can be detected by a position sensor and/or proximity switches, the motor 2 is switched off. The directional valve 22 is likewise switched into the second switching state and thus a hydraulic short circuit created between the outlet 3b and the intake 3a of the pump 3. The first valve 10 and the second valve 11 remain in the second switch position; i.e. they represent spring-loaded check valves. The piston 5 immediately remains in its reached position due to the position of the directional valve 22 and is not affected by the continued running of the motor 2/pump 3. The working fluid pumped by the continued running of the motor 2/pump 3 is directly returned to the intake 3a of the pump 3 via the hydraulic short circuit. The working fluid can thereby thus be confined in the piston 5 and a position which the piston has reached in the cylinder housing 6 securely maintained.

In a first advantageous operating mode of the embodiment according to FIG. 2, a full extending of the piston 5 is effected by the first valve 10 being brought into the first switch position, and thus a fluid connection being established between the first connection 8 and the second connection 9, while the second valve 11 remains in the second switch position. The pretensioned spring 7 relaxes commensurate with the decreasing hydrostatic pressure and extends the piston 5. This thus thereby enables an uncontrolled and full extension of the piston 5 and the piston rod at maximum speed. Reaching the maximum extending speed, just as is the case with the FIG. 1 embodiment, in particular depends on the maximum volumetric throughflow of the first valve 10. Furthermore, a plurality of first valves 10 connected parallel to each other can also be provided, thereby achieving a redundancy of this functionality.

A second advantageous operating mode of the inventive hydraulic drive according to FIG. 2 is used to partially extend the piston 5 with the piston rod. This can be understood in the sense of the present invention as a partial stroke test. When the piston 5 is fully retracted and the motor 2/pump 3 is at a standstill, the second valve 11 is brought into the first switch position and a fluid connection is established from the first connection 8 to the second connection 9. As soon as the piston 5 is at least partly extended and the desired target position reached, e.g. as can be detected by a proximity switch, the second valve 11 is brought into the second switch position and the fluidic connection between the first and second connection 8; 9 disconnected, the directional valve 22 is brought into the first switch position for fluidly connecting to the blind connections, and the motor 2/pump 3 is activated so as to again fully extend the piston 5. As soon as the piston 5 is detected as being at the end position and fully extended, the motor 2/pump 3 is switched off and the directional valve 22 again brought into the second switch position to produce a hydraulic short circuit between the outlet 3b and the intake 3a of the pump 3.

Due to the advantageous configuration of the inventive subject matter pursuant to FIG. 2, a full extending of the piston 5 at maximum speed as well as a partial, preferably slow extending of the piston 5, in particular independent of positional variance, along with subsequent full retraction is possible. Moreover, confining of the working fluid in the lifting cylinder 4 via the first and second valve 10; 11 as well as the check valve 14 is possible in order to be able to securely maintain a position of the piston 5 even over longer periods of time. A valve coupled to the free end of the piston rod is securely and reliably controllable with the present invention.

LIST OF REFERENCE NUMERALS

1: hydraulic actuator
2: motor
3: pump
3a: pump intake
3b: pump outlet
4: lifting cylinder
5: piston
6: housing
7: spring
8: first connection
9: second connection
10: first valve
11: second valve
12: reservoir
13: pressure relief valve
14: check valve
15: throttle device, first valve
16: throttle device, second valve
17: coupling
18: pressure sensor
19: temperature sensor
20: position sensor
21: forced leakage throttle apparatus
22: directional valve

The invention claimed is:

1. A hydraulic drive for executing a linear movement comprising:
   a motor;
   a pump;
   a lifting cylinder further comprising:
      a linearly movable piston and a cylinder housing having at least one first connection and at least one second connection;
      a spring arranged such that the piston can be extended or retracted when the spring is in a relaxed state; and
      at least one first valve with which the at least one first connection and the at least one second connection of the cylinder housing can be fluidly connected, wherein at least one second valve is connected in parallel with the at least one first valve, and wherein the at least one first valve has a maximum volumetric throughflow which is greater than a maximum volumetric throughflow of the at least one second valve;
   wherein at least one throttle device is provided in fluidic connections between the at least one first connection and the at least one first valve and/or between the at least one first connection and the at least one second valve.

2. The hydraulic drive according to claim 1, wherein the at least one first valve and the at least one second valve are spring-loaded, electromagnetically adjustable directional valves.

3. The hydraulic drive according to claim 1, wherein the at least one first valve and the at least one second valve have a first switch position with a flow path so a fluidic connection can be established from the at least one first connection to the at least one second connection and a second switch position with a spring-loaded check valve in which the at least one first valve and/or the at least one second valve can disconnect the fluidic connection from the at least one first connection to the at least one second connection.

4. The hydraulic drive according to claim 1, wherein the pump is configured with an intake and an outlet to pump a working fluid in at least one direction.

5. The hydraulic drive according to claim 4, wherein a reservoir for the working fluid is provided and fluidly connected to the at least one second connection and the intake of the pump.

6. The hydraulic drive according to claim 5, wherein a pressure relief valve is provided such that the outlet of the pump and the reservoir can be fluidly connected upon a definable maximum pressure being reached at the outlet of the pump.

7. The hydraulic drive according to claim 4, wherein at least one temperature sensor and/or at least one pressure sensor is fluidly connected to the at least one first connection and/or the at least one second connection and/or the outlet of the pump and/or the intake of the pump.

8. The hydraulic drive according to claim 4, wherein a spring-loaded check valve is provided such that a fluidic connection from the at least one first connection to the outlet of the pump or from the outlet of the pump to the intake of the pump can be disconnected by the spring-loaded check valve.

9. The hydraulic drive according to claim 4, wherein a directional valve is provided between the outlet of the pump and the intake of the pump so a fluid connection from the outlet of the pump to the intake of the pump can be disconnected at a first switch position of the directional valve and can be established at a second switch position of the directional valve.

10. The hydraulic drive according to claim 1, wherein a position sensor is provided on the lifting cylinder so a position of the piston in the cylinder housing can be determined.

11. The hydraulic drive according to claim 1, wherein a forced leakage throttle apparatus is provided between the at least one first connection and the at least one second connection.

12. A method for application of the hydraulic drive in accordance with claim 1, wherein the pump is driven continuously and/or when needed by the motor to circulate a working fluid in a closed system and/or produce a linear movement of the piston and/or maintain a position of the piston in the cylinder housing.

13. The method according to claim 12, wherein the at least one first valve and/or the at least one second valve have a second switch position in order to at least partly retract the piston or maintain a position of the piston, wherein the at least one first valve is brought into a first switch position in order to fully extend the piston or the at least one second valve is brought into a first switch position in order to extend the piston to a definable position and/or maximize an extending speed of the piston.

14. A hydraulic drive for executing a linear movement comprising:
  a motor;
  a pump;
  a lifting cylinder further comprising:
    a linearly movable piston and a cylinder housing having at least one first connection and at least one second connection;
    a spring arranged such that the piston can be extended or retracted when the spring is in a relaxed state;
    at least one first valve, with which the at least one first connection and the at least one second connection of the cylinder housing can be fluidly connected; and
    at least one second valve connected in parallel with the at least one first valve, wherein the at least one first valve has a maximum volumetric throughflow which is greater than a maximum volumetric throughflow of the at least one second valve;
  a reservoir fluidly connected to the at least one second connection and an intake of the pump;
  a pressure relief valve so that an outlet of the pump can be fluidly connected to the reservoir upon a definable maximum pressure being reached at the outlet of the pump;
  a coupling for transferring force or torque respectively between the motor and the pump;
  at least one throttle device in fluidic connections between the at least one first connection and the at least one first valve as well as between the at least one first connection and the at least one second valve;
  at least one temperature sensor and/or at least one pressure sensor fluidly connected to the at least one first connection and/or the at least one second connection and/or the outlet of the pump and/or the intake of the pump;
  a position sensor to determine a position of the piston in the cylinder housing;
  a spring-loaded check valve so a fluidic connection from the outlet of the pump to the intake of the pump can be disconnected by the spring-loaded check valve; and
  a forced leakage throttle apparatus provided between the at least one first connection and the at least one second connection.

15. A hydraulic drive for executing a linear movement comprising:
  a motor;
  a pump;
  a lifting cylinder further comprising:
    a linearly movable piston and a cylinder housing having at least one first connection and at least one second connection;
    a spring arranged such that the piston can be extended or retracted when the spring is in a relaxed state;
    at least one first valve, with which the at least one first connection and the at least one second connection of the cylinder housing can be fluidly connected; and
    at least one second valve connected in parallel with the at least one first valve, wherein the at least one first valve has a maximum volumetric throughflow which is greater than a maximum volumetric throughflow of the at least one second valve;
  a reservoir fluidly connected to the at least one second connection and an intake of the pump;
  a pressure relief valve so that an outlet of the pump can be fluidly connected to the reservoir upon a definable maximum pressure being reached at the outlet of the pump;
  a coupling for transferring force or torque between the motor and the pump;
  at least one throttle device in fluidic connection between the at least one first connection and the at least one second valve;
  at least one pressure sensor, fluidly connected to the at least one first connection and/or the at least one second connection and/or the outlet of the pump and/or the intake of the pump;

a spring-loaded check valve so that a fluidic connection from the at least one first connection to the outlet of the pump can be disconnected by the spring-loaded check valve; and a directional valve between the outlet of the pump and the intake of the pump so that a fluid connection from the outlet of the pump to the intake of the pump can be disconnected at a first switch position of the directional valve and can be established at a second switch position of the directional valve.

* * * * *